Oct. 31, 1961     C. McCLELLAN PHILLIPS     3,006,325
ANTI SMOG SCAVENGING ATTACHMENT FOR
INTERNAL COMBUSTION ENGINES
Filed April 25, 1960
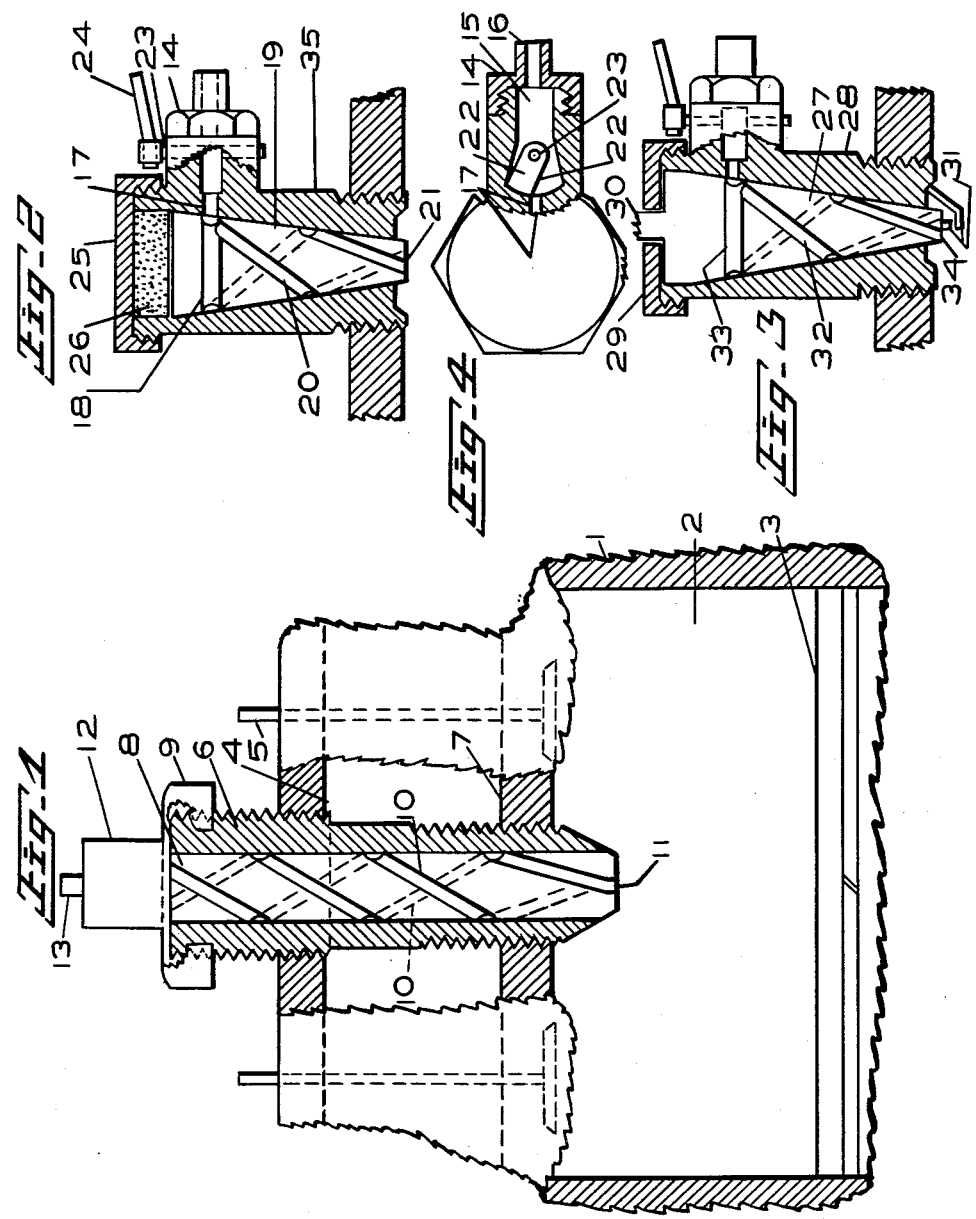

United States Patent Office 3,006,325
Patented Oct. 31, 1961

3,006,325
ANTI SMOG SCAVENGING ATTACHMENT FOR INTERNAL COMBUSTION ENGINES
Curtis McClellan Phillips, Rudyard, Mont.
Filed Apr. 25, 1960, Ser. No. 24,455
3 Claims. (Cl. 123—1)

This invention relates to attachments for internal combustion engines by which air under pressure is injected downward into each cylinder, impinging in a spiral stream on the piston head for effecting discharge of the heavy, unburnt particles of gas during the exhaust stroke.

In the art to which the invention relates the primary cause of smog in cities subjected to heavy fogs is the presence in the atmosphere of heavy, unburnt fuel particles that result from insufficient combustion and lack of complete scavenging.

Formerly the injection of the charge made up of oxygen and gasoline resulted in it being mixed with the burnt gas remaining in the combustion chamber and this contained a portion of foreign gas particles. When this mixture was compressed in the combustion stroke some gasoline was mixed with the burnt gas or carbon monoxide, and the mixture that resulted would not burn for lack of oxygen and consequently these portions of burnt gas contained two or more portions of gasoline impurities and unburnt gasoline.

This portion of unburnt gas or carbon monoxide is one eighth to one fifth of the exahust gases, this depending on the compression ratio. These parts will be heavier than from lower compression motors and are too heavy to rise in view of the weight relative to atmospheric pressure, and can form a cloud floating near the ground. The injection of air as herein proposed also keeps the spark plugs, cylinder and pistons cooler, aids in eliminating carbon, and effects a saving in gasoline.

The present invention is concerned with eliminating resulting smog by directing a spiral stream of swirling air downward against the piston head during the rise of the piston in the exhaust stroke. The regulation of the air injection to coincide with the exhaust stroke and the discharge of the waste gases from the cylinder can be regulated by attachments to the exhaust rocker arms or cam shaft in a manner common in the art.

The air is taken through the air cleaner from a pump or air tank to inlet valves on the compression head and from there injected through the air injection attachment as herein provided.

In the drawings, which illustrate preferred embodiments of the invention,

FIG. 1 is an enlarged side view of a fragment of an engine cylinder that includes the piston head and valves and is shown with an air injection attachment in accordance with my invention mounted in the cylinder depending within the combustion chamber of the cylinder, parts being shown broken away and in vertical section.

FIG. 2 shows a side view of an air injection attachment somewhat different from the showing in FIGURE 1, and illustrated as in attachment to the cylinder head delivering into the combustion chamber, shown in part broken away and largely in vertical section.

FIG. 3 shows a side view of a spark splug threaded into the cylinder head, illustrated with the air injection attachment incorporated in a spark plug and the spiral air intake channels formed in the porcelain of the plug, parts being shown broken away and parts in section.

FIG. 4 is a top plan view of an air injection unit as in FIGURE 2, shown partly in horizontal section to disclose the valve chamber and valve.

Having reference to the drawings, more particularly to FIGURE 1, there is shown a fragment 1 of an engine cylinder that includes a combustion chamber 2 and piston head indicated at 3, the water jacket 4 and valve stems 5 carrying valves as indicated in phantom.

Threaded in complementary openings in the water jacket and cylinder head is an air injection unit in accordance with my invention by which a blast of spirally directed air may be caused to impinge on the piston head as near the center of the piston as possible.

This injection unit consists of a body 6 threaded for engagement in the jacket 4 and cylinder head 7. Within the body, or casing 6 is mounted a porcelain core 8 with one or more spiral channels 10 extending lengthwise about the core and terminating in a common outlet at 11 by which air under pressure may be injected into the combustion chamber directly against the piston head 3.

On the unit casing 6 is threaded a cap 9 with valve casing 12 and air inlet pipe 13. A valve assembly for the purpose of the present invention is illustrated in FIGURES 2, 3 and 4.

In these showings, in FIGURES 2 and 4 a valve casing 14 is formed integral with the injection unit casing and includes a valve chamber 15 to which an inlet pipe 16 delivers, the valve chamber discharging through an air inlet passage 17 formed in the body of the valve casing for delivery to a porcelain core 19.

The inlet 17 discharges through a semi-circular channel 18 formed in the core 19, which core is mounted in a unit casing 35, the channel delivering the air downward through spiral channels 20 and discharging through a common outlet 21 into the combustion chamber against the piston head. For regulating injection of air under pressure through the units a valve 22 is mounted in the valve chamber 15 on a stem 23 to be actuated by a lever arm 24, which arm would be operated by connections with the engine exhaust rocker arms or cam shaft. On the injection unit head in this showing is threaded a cap 25 and included is a packing 26 to prevent escape of air.

The showing in FIGURE 3 illustrates use of the injection unit core in a spark plug, the core, indicated by the numeral 27, mounting in a casing 28 secured by a cap 29 and including a lead 30 for the sparking elements 31. As in the showing in FIGURE 2 the spiral channels 32 and semi-circular connecting channel 33 are formed in the core and deliver through a common outlet 34. This arrangement is designed for use in engines at present in service.

In the use of the device air under pressure is injected into the cylinder head from a compressor tank, the air passing through the valve chamber 15 and its injection is here controlled by the valve 22 actuated by the lever arm 24, which in turn would be controlled by connections with the engine exhaust rocker arms or cam shaft.

The air is passed through channels 18 and spiral channels 20, or the corresponding channels in FIGURE 1, and discharges as a swirling stream against the piston head.

The device may be used on either gasoline operated or diesel engines, and ensures disposal of the heavy, unburnt fuel particles without creating smog in a fog filled atmosphere.

Having thus particularly described by invention, what I claim is:

1. A unit by which air under pressure may be injected into the combustion chamber of an internal combustion engine cylinder, said unit including a casing adapted for mounting in the cylinder projecting into the combustion chamber, a core in the casing having one or more spiral channels extending lengthwise of the core, the casing having an air inlet, the core having a passage communicating between the air inlet and spiral channels, and said channels having outlets delivering into the combustion chamber.

2. A unit by which air under pressure may be injected into the combustion chamber of an internal combustion engine cylinder, said unit including a casing for mounting in the cylinder head projecting downward into the combustion chamber, a core in the casing having spiral channels extending lengthwise of the core and terminating in a common outlet, the casing having an air inlet and the core having a passage communicating between the air inlet and channels.

3. A unit by which air under pressure may be injected into the combustion chamber of an internal combustion engine cylinder, said unit including a casing for mounting in the cylinder head projecting downward into the combustion chamber, a core in the casing having one or more spaced spiral channels extending lengthwise of the core delivering into the combustion chamber, said casing including an air inlet and the core having a passage between the air inlet and spiral channels, and a valve casing on the unit casing, said valve casing having an air passage therethrough and valve means controlling passage of the air through the valve casing.

References Cited in the file of this patent
UNITED STATES PATENTS

| | | |
|---|---|---|
| 1,503,383 | Sargent | July 29, 1924 |
| 1,511,281 | Kennedy | Oct. 14, 1924 |
| 1,754,796 | McElroy | Apr. 15, 1930 |
| 1,873,119 | Griswold | Aug. 23, 1932 |
| 2,263,318 | Tifft | Nov. 18, 1941 |